United States Patent

Agelet et al.

[11] Patent Number: 5,159,628
[45] Date of Patent: Oct. 27, 1992

[54] HOOK-OFF DETECTION DEVICE FOR A TELEPHONE HANDSET

[75] Inventors: Juan Agelet, Barcelona; Gabriel Olivares, Viladecans, both of Spain

[73] Assignee: Sextant Avionique, Meudon-la-Foret, France

[21] Appl. No.: 607,324

[22] Filed: Oct. 31, 1990

[30] Foreign Application Priority Data

Nov. 3, 1989 [FR] France .................. 89 14736

[51] Int. Cl.$^5$ ............................................. H04M 1/00
[52] U.S. Cl. ..................... 379/424; 379/427; 379/448
[58] Field of Search ............... 379/419, 422, 424, 425, 379/427, 441, 447, 448

[56] References Cited

U.S. PATENT DOCUMENTS

| | | | |
|---|---|---|---|
| 4,188,512 | 2/1980 | Lord | 379/427 |
| 4,436,964 | 3/1984 | Haskins | 379/427 |
| 4,614,845 | 9/1986 | Conlon | 379/448 |
| 4,638,126 | 1/1987 | Breu et al. | 379/427 |
| 4,674,120 | 6/1987 | Heldenbrand | 379/427 |
| 4,692,940 | 9/1987 | Banes | 379/424 |
| 4,696,033 | 9/1987 | Else | 379/424 |
| 4,727,573 | 2/1988 | Kakuta et al. | 379/388 |
| 4,874,912 | 10/1989 | Kakura et al. | 379/427 |

FOREIGN PATENT DOCUMENTS

| | | | |
|---|---|---|---|
| 0154394 | 9/1985 | European Pat. Off. | 379/424 |
| 3128813 | 3/1983 | Fed. Rep. of Germany | 379/424 |
| 3838856A1 | 11/1988 | Fed. Rep. of Germany . | |
| 53-38907 | 9/1976 | Japan . | |
| 0241456 | 10/1987 | Japan | 379/424 |
| 1040621 | 9/1983 | U.S.S.R. | 379/424 |
| 2126839 | 3/1984 | United Kingdom | 379/427 |
| 2207324A | 7/1987 | United Kingdom . | |
| 2201063 | 8/1988 | United Kingdom | 379/424 |

Primary Examiner—James L. Dwyer
Assistant Examiner—William Cumming
Attorney, Agent, or Firm—Lowe, Price, LeBlanc & Becker

[57] ABSTRACT

A device for detecting the hooking off of a telephone handset from a telephone set body, comprises an elongated part (8) provided with hinges (11) rotating around a longitudinal axis (10); a key (6), constituted by a lateral extension of said part and positioned so as to protrude through the upper wall of the body in a raised position; a return spring (15) for urging said key in a raised position; and a push-button switch (12) fixed on said part, the button (13) of which glides on an internal surface of the base to pass from a first state to a second state when the handset is hooked off and on.

14 Claims, 2 Drawing Sheets

HOOK-OFF DETECTION DEVICE FOR A TELEPHONE HANDSET

BACKGROUND OF THE INVENTION

The present invention relates to the field of telephone sets and more particularly to a device for detecting the hooking off of a telephone handset.

Actually, a significant effort is made in designing telephone sets to render them aesthetical so that they harmonize with the environment where they are to be used.

Thus, since a few years, there are telephone sets wherein the telephone handset, instead of actuating metal parts protruding from the base, lies on a cradle, a portion of which comprises a key actuated by hooking off or hooking on the handset for acting on a line pick-up switch.

For example, a telephone set may comprise a line pick-up switch, a contact of which is integral with the base and the other contact with a portion of the cradle, which causes connection and cleanliness problems for the non-protected contacts.

On the other hand, in order to reduce the size of telephone sets and to improve their reliability, the various electric and electronic components necessary for the operation of these sets are actually generally arranged on printed circuits arranged in the telephone body. Thus, logically, one has been compelled to use line pick-up switches set on a printed circuit and actuating the handset detection key causes, through possible intermediate levers, triggering of the switch.

Due to the arrangement of the switch on a printed circuit, various requirements appear. Indeed, the transmission of the motion between the key and the switch arranged on the printed circuit necessitates a determined relative positioning between this key and the integrated circuit and constrains the switch position on the integrated circuit, if it is desired to obtain a simple and reliable mechanical operation. On the other hand, the portion of the key that protrudes from the telephone body must be aesthetical to match the general aspect of this set, which often implies the use of materials having the same quality and same colour as the remaining portion of the base frame. However, such a material may not have the same desirable mechanical characteristics for the transmission of the displacement towards the switch. Therefore, it has sometimes been necessary to incorporate additional reinforcement or transmission parts which increase the final cost of the product.

SUMMARY OF THE INVENTION

Thus, an object of the invention is to provide a device detecting the hooking off of a telephone handset ensuring a larger flexibility in possible choices for positioning the various components of the telephone set in the telephone body.

Another object of the invention is to provide such a device which is compact and reliable.

A further object of the invention is to provide such a device which is particularly simple to assemble and to mount.

To achieve those objects, the invention provides a device pre-assembled prior to mounting in a telephone set body. This device comprises a key for detecting the hooking off of the handset integral with a plate rotating around an axis, biased into hook off position by means of a spring and carrying a push-button switch. Once the device is fitted in the plate, the push-button abuts against the portion of the plate frame so as to cause the switch to change its state when the key is actuated and the plate passes from one position to another.

More particularly, the invention provides a device for detecting the hooking off of a telephone handset from a telephone set body, comprising: an elongated part provided with hinges allowing it to pivot around a longitudinal axis; a key constituted by a lateral extension of said part and positioned in order to protrude through the upper wall of the body; a return spring to urge said key in a raised position; and a pushbutton switch fitted on said part, the button of which glides on an internal surface of the plate so as to pass from a first state to a second state when the handset is hooked off and hooked on.

According to an embodiment of the invention, the elongated part comprises a structure for receiving the switch and the return spring positioned one on top of the other, and means for blocking the return spring when the device is not installed in the set.

According to an embodiment of the invention, the axis of rotation is out of center with respect to the elongatd part, the switch and the spring being on the same side of this axis as the key.

BRIEF DESCRIPTION OF THE DRAWINGS

The foregoing and other objects, features and advantages of the invention will be apparent from the following detailed description of preferred embodiments as illustrated in the accompanying drawings wherein.

It will be noted that these figures are relatively schematic and that their various elements are not drawn to scale either inside one figure nor from one figure to another. Moreover, the shapes of the parts are liable to be modified provided that their functions are maintained, as will be explained later on.

Some of these figures will not be described individually in detail but the same references are used in these various figures for designating identical or analogous part portions.

DETAILED DESCRIPTION OF THE INVENTION

Figure 1:
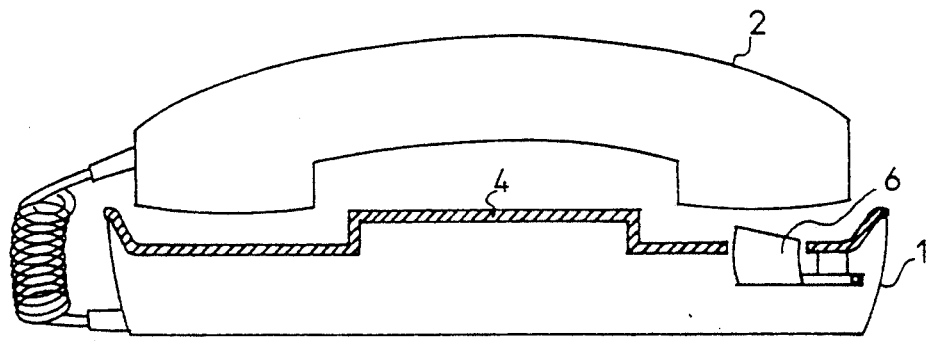
FIG. 1 is a partially cut-away and schematic front view of a telephone set incorporating a device according to the invention.

FIG. 1 shows a telephone set comprising a body 1 and a telephone handset 2 represented in a raised position and normally intended to lie down on a cradle arranged in the upper wall 4 of the body. A key 6, urged in raised position by means of a spring, passes through an aperture in this upper wall and is liable to be actuated by the weight of the handset. The structure and mounting of this key in relation with a line pick-up switch are the object of the invention and will be described in more detail later on.

Figure 2:
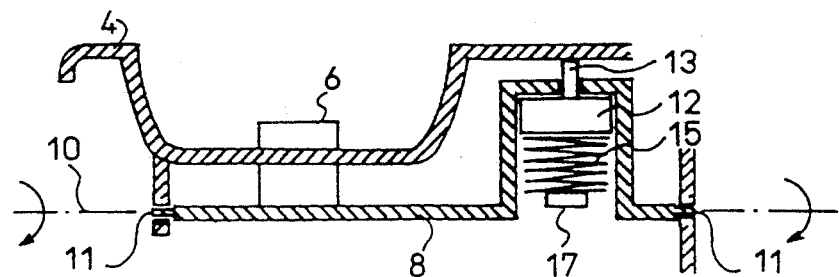
FIG. 2 is a partially cut-away and schematic front view of a telephone set incorporating a device according to the invention.
Figure 4:
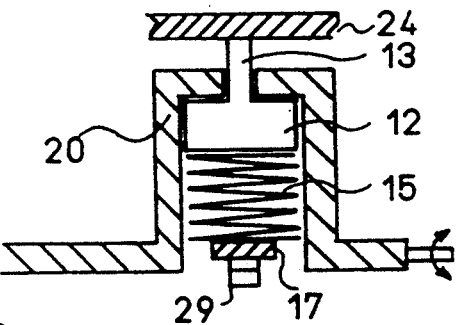
FIG. 4 is a partially cut-away and schematic front view of a device according to the invention.

FIG. 2 is a partially cut-away schematic front view corresponding to FIG. 1, wherein one can laterally see the cradle formed in the upper wall 4 of the body and the above described key 6. The key 6 constitutes the lateral extension of a plate 8 designed to be fixed in the base so as to be rotated around an axis 10 defined by hinges 11 while actuating the key. On this plate 8 are mounted a switch 12 with a push-button 13 and a return spring 15 lying on a rib 17 of the telephone body.

Figure 3:
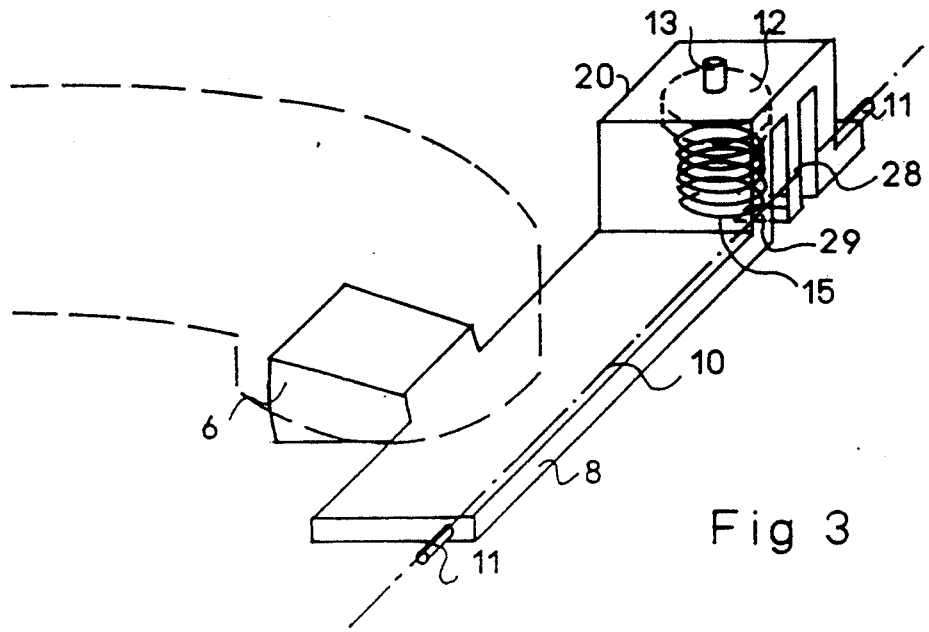
FIG. 3 is a partially cut-away schematic perspective view of a device according to the invention.

FIG. 3 represents a schematic embodiment of a device according to the invention assembled prior to mounting in a telephone set body. The key 6 is integral with plate 8 provided at its longitudinal extremities with hinges 11 defining a rotation axis 10 on the side of plate 8 opposite to key 6 to allow a rotation of the unit constituted by key 6 and plate 8. Near an extremity of the plate, and integrally with the latter, is provided a structure 20 maintaining a push-button switch 12, the button 13 of which protrudes towards the outer part of the device. As shown in FIGS. 2, 4, 6 and 7, once the device is fitted in the body, the push-button can be in a pushed down state, abutting against a portion 21 of the upper wall 4, or can exit when key 6 is pressed.

According to an embodiment of the invention, the structure 20 also contains a return spring 15. The spring abuts against the lower surface (opposite to the pushbutton) of the switch 12, thus ensuring blocking of the switch, and is designed, once the spring is fitted in the body, so as to abut against a rib of said plate to ensure the return function of the spring.

In order to facilitate the assembly of the device according to the invention prior to its mounting in a telephone set body, the structure 20 comprises flexible tongues 28 internally curved at their lower extremities 29 allowing insertion of the switch and of the spring and ensuring blocking of these two parts once the spring is positioned.

Preferably, the whole part illustrated in FIG. 3 is made of moulded plastics, this plastic material having a sufficient flexibility for allowing tongues 28 to be spaced away. As conventional, the part will not effectively have the simplified shape illustrated in FIG. 3 but will be provided with various reinforcement ribs and grooves permitting the possible passage of other parts.

Once the device according to the invention is assembled, it is placed in the telephone body so that hinges 11 enter into bearings so that spring 15 abuts against a rib 17 integral with the lower wall of the telephone set body. Rib 17 is arranged so as to penetrate between the curved extremities 29 of tongues 28 and to slightly press spring 15 which then no longer abuts against these extremities 29 that only served for pre-assembling the device according to the invention.

Figure 5:
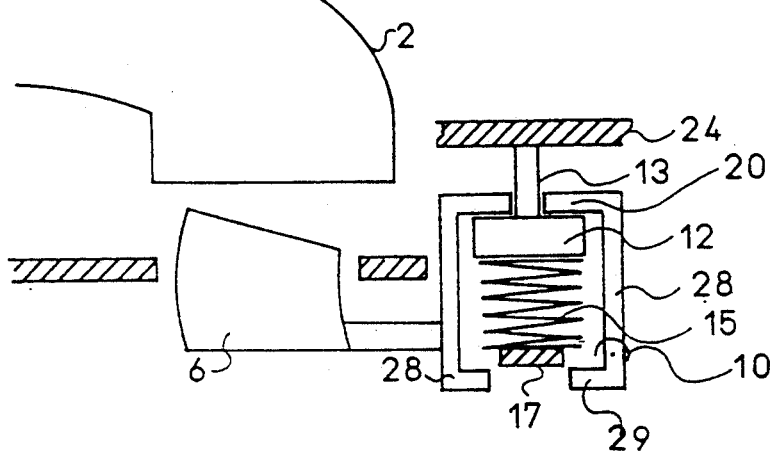
FIG. 5 is a partially schematic and enlarged front view of a device according to the invention.

FIG. 5 is a very simplified drawing and is designed to more clearly show tongues 28.

Figure 6:
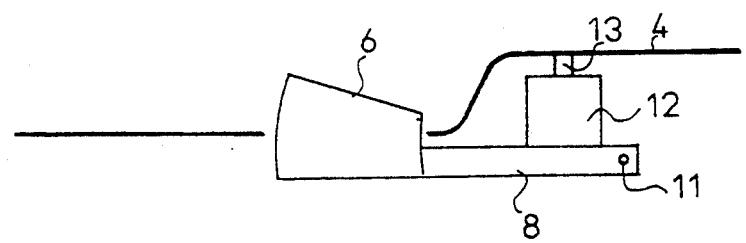
FIGS. 6 and 7 are partially schematic front views illustrating the operation of the device according to the invention.
Figure 7:
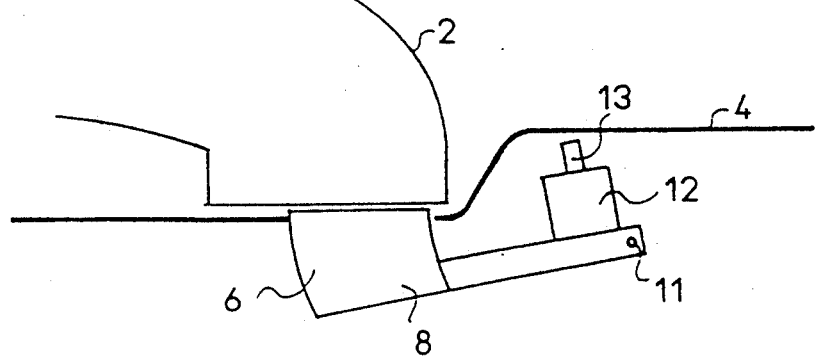

FIGS. 6 and 7 will be clearly understood from the above explanations. They are intended to better illustrate the displacement of the push-button switch when key 6 is free or pressed, respectively.

Thus, a simple, flat and small-size unit permits to directly actuate a line pick-up switch by activating a key receiving a telephone handset, the switch being directly and mechanically integral with the key. This switch is of course provided with terminals and connections designed to connect the switch to electrical components, generally arranged on a printed circuit board, ensuring the various functions of the telephone set. Although the main function of this switch is a pick-up line function, it is well known that this switch generally permits realizing other auxiliary electrical functions and therefore is usually a multicontact switch.

An advantage of the invention is to permit positioning printed circuits independently of the positioning of the handset key.

According to a further advantage of the invention, the telephone handset detecting device is particularly simple since its components can be pre-assembled prior to mounting in the base of an adapted telephone set.

We claim:

1. A device for detecting the hooking off of a telephone handset from a telephone set body, comprising:
   an elongated part provided with hinges rotating around a longitudinal axis of the telephone set body;
   a key, constituted by a lateral extension of said part and positioned so as to protrude through the upper wall of the telephone set body;
   a return spring for urging said key in a raised position; and
   a push-button switch fixed on said part, the button of which interacts with an internal surface of the telephone set body to pass from a first state to a second state when the handset is hooked off and on.

2. A device according to claim 1, wherein said part comprises a structure for receiving the switch and the return spring one on top of the other, and means for blocking the return spring when said device is not mounted in the telephone set body.

3. A device according to claim 1, wherein said longitudinal axis is out of center with respect to said part, the switch and the spring being on the same side of said axis as key.

4. A device according to claim 1, wherein said switch is a multicontact switch.

5. A device for detecting the hooking off of a telephone handset, from a telephone set body, comprising:
   a push-button switch, the button of which interacts with an internal surface of the telephone set body to pass from a first state to a second state when the handset is hooked off and on; and
   a plate supporting said push-button switch and rotating around a longitudinal axis of the telephone set body in response to the hooking off of the handset;
   said plate comprising a member extending in a direction normal to the longitudinal axis, said member being actuated by the handset.

6. A device according to claim 5, wherein said push-button switch is a multicontact switch.

7. A device according to claim 5, further comprising a return spring for urging said member in a raised position.

8. A device according to claim 5, wherein said longitudinal axis is out of center with respect to said plate.

9. A device according to claim 7, wherein said spring and said pressure switching means are on the same side of said longitudinal axis as said member.

10. A device according to claim 7, wherein said plate comprises a structure for receiving said pressure switching means and said spring one on top of the other.

11. A device for detecting the hooking off of a telephone handset from a telephone set body, comprising:
   a plate rotating around a longitudinal axis of the telephone set body;

an actuator constituted by a lateral extension of said plate;

a return spring for urging said actuator in a raised position; and a push-button switch fixed on said plate, the button of which interacts with an internal surface of the telephone set body to pass from a first state to a second state when the handset is hooked off and on.

12. A device according to claim 11, wherein said plate comprises a structure for receiving the switch and the return spring one on top of the other, and means for blocking the return spring when said device is not mounted in the telephone set body.

13. A device according to claim 11, wherein said longitudinal axis is out of center with respect to said plate, the switch and the spring being on the same side of said axis as the actuator.

14. A device according to claim 11, wherein said switch is a multicontact switch.

* * * * *